(12) United States Patent  
Athalye et al.

(10) Patent No.: US 8,000,326 B2
(45) Date of Patent: Aug. 16, 2011

(54) METHOD AND APPARATUS FOR FRAGMENTING A CONTROL MESSAGE IN WIRELESS COMMUNICATION SYSTEM

(75) Inventors: Sanjeev Arvind Athalye, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 741 days.

(21) Appl. No.: 12/022,932

(22) Filed: Jan. 30, 2008

(65) Prior Publication Data

US 2008/0186885 A1 Aug. 7, 2008

Related U.S. Application Data

(60) Provisional application No. 60/887,777, filed on Feb. 1, 2007.

(51) Int. Cl.
*H04L 12/28* (2006.01)
*H04L 12/56* (2006.01)

(52) U.S. Cl. ........................................ 370/390

(58) Field of Classification Search ................. None
See application file for complete search history.

(56) References Cited

U.S. PATENT DOCUMENTS

| | | | | |
|---|---|---|---|---|
| 5,954,775 | A * | 9/1999 | Cluff | 701/45 |
| 6,757,548 | B1 * | 6/2004 | Dorenbosch | 455/517 |
| 2002/0143868 | A1 * | 10/2002 | Challenger et al. | 709/203 |
| 2003/0081628 | A1 * | 5/2003 | Sugar et al. | 370/461 |
| 2005/0226227 | A1 | 10/2005 | Kim et al. | |

FOREIGN PATENT DOCUMENTS

| | | |
|---|---|---|
| EP | 1672818 A1 | 6/2006 |
| KR | 20050099930 A | 10/2005 |
| WO | WO2009408432 | 4/1994 |
| WO | WO0044122 | 7/2000 |

OTHER PUBLICATIONS

International Search Report and Written Opinion—PCT/US2008/052831, international Search Authority—European Patent Office—Jul. 31, 2008.
ITRI: "BCH load reduction by sharing with Dl-SCH," R2-061247, 3GPP TSG RAN WG2 Meeting #53,Shanghal., China, May 8, 2006, XP002483778, Retrieved from the Internet: URL:http://wwvv.3gpp.org/ftp/Specs/html-info/TDocExMtg—R2-53—25411.htm, [retrieved on Jul. 17, 2008].
Panasonic: "Flexible rate transmission of BCCH," R2-060887, 3GPP TSG RAN.

(Continued)

*Primary Examiner* — Raj K Jain
(74) *Attorney, Agent, or Firm* — Eric Ho

(57) ABSTRACT

Techniques for sending control information are described. In an aspect, information to send in a control message may be fragmented into multiple parts, with each part including information of a particular type. The multiple parts may be segregated into multiple categories such as dynamic, semi-static, and static. A full message containing all parts may be generated and sent at a first rate. A first partial message containing parts in the dynamic category may be generated and sent at a highest rate. A second partial message containing parts in the semi-static category may be generated and sent at a second rate that is slower than the highest rate. A third partial message containing parts in the static category may be generated and sent at a third rate that is slower than the second rate.

34 Claims, 9 Drawing Sheets

OTHER PUBLICATIONS

WG2#52, Athens, Greece, Mar. 27-31, 2006, pp. 1-4, XP002488777, Retrieved from the Internet: URL:http://www.3gpp.org/FTP/Specs/html-info/TDocExMtg—R2-52—25516.htm> [retrieved on Jul. 17, 2008].

Panasonic: "System Information mapping for E-UTRA," 3GPP TSG RAN WG2#54, Tallinn, Estonia, Aug. 28, 2006, XP002488776, Retrieved from the Internet: URL:http://www.3gpp.net/ftp/specs/html-info/TDocExMtg—R2-54—25412.htm> [retrieved on Jul. 17, 2008].

Translation of Office Action in Korean application 10-2009-7018260 corresponding to U.S. Appl. No. 12/022,932, citing US20030081628 and KR20050099930 dated Feb. 11, 2011.

\* cited by examiner

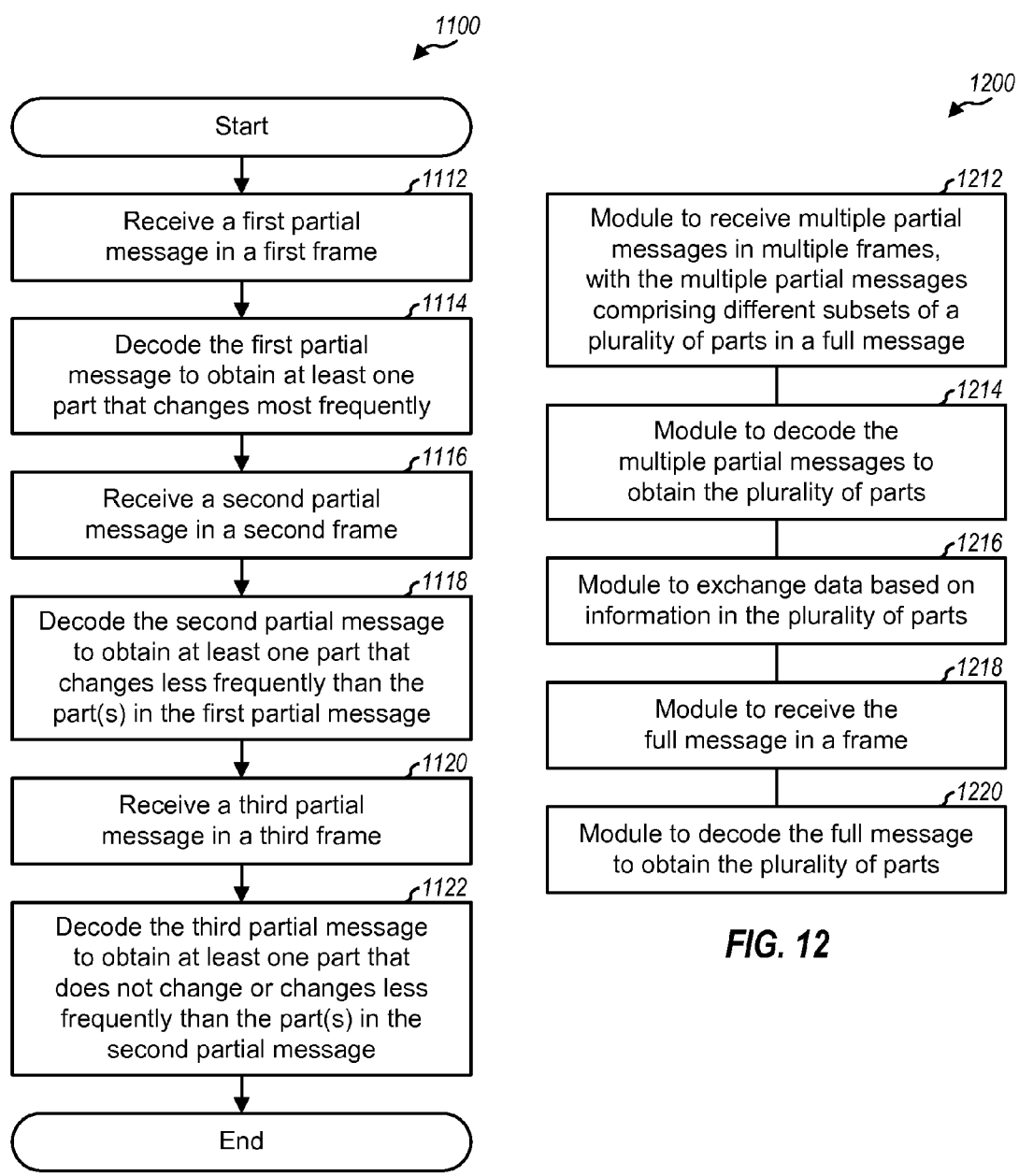

METHOD AND APPARATUS FOR FRAGMENTING A CONTROL MESSAGE IN WIRELESS COMMUNICATION SYSTEM

CLAIM OF PRIORITY UNDER 35 U.S.C. §119

The present application for patent claims priority to Provisional U.S. Application Ser. No. 60/887,777, entitled "A METHOD AND APPARATUS FOR FRAGMENTING A CONTROL MESSAGE IN WIRELESS COMMUNICATION SYSTEM," filed Feb. 1, 2007, assigned to the assignee hereof, and expressly incorporated herein by reference.

BACKGROUND

I. Field

The present disclosure relates generally to communication, and more specifically to techniques for transmitting control information in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may periodically transmit a control message to subscriber stations. The control message may contain various types of information such as assignments of resources for the downlink and uplink, parameters to use for transmissions on the downlink and uplink, etc. The information in the control message may be referred to as control information, overhead information, signaling, etc. The control message may be relatively long and may need to be transmitted such that it can be reliably received by all subscriber stations. This may result in a large amount of resources being used to send the control message. There is therefore a need in the art for techniques to efficiently send control information.

SUMMARY

Techniques for efficiently sending control information in a wireless communication system are described herein. In an aspect, the information to send in a control message may be fragmented into multiple parts, with each part including information of a particular type. The multiple parts may be segregated into multiple categories such as dynamic, semi-static, and static. The dynamic category may include one or more parts that may change most frequently, e.g., from frame to frame. The semi-static category may include one or more parts that may change less frequently. The static category may include one or more parts that may change very infrequently or not at all.

In one design, a base station may generate a full message containing all parts and may send the full message at a first rate. The base station may generate a first partial message containing parts in the dynamic category and may send this message at a highest rate. The base station may generate a second partial message containing parts in the semi-static category and may send this message at a second rate that is slower than the highest rate. The base station may generate a third partial message containing parts in the static category and may send this message at a third rate that is slower than the second rate. The first rate for the full message may be faster or slower than the second rate for the second partial message for the semi-static parts.

In one design, a subscriber station may receive the partial messages in multiple frames and may decode these partial messages to obtain the multiple parts. The subscriber station may also receive the full message and may decode this message to obtain the multiple parts. The subscriber station may exchange data based on the information in the multiple parts.

Various aspects and features of the disclosure are described in further detail below.

BRIEF DESCRIPTION OF THE DRAWINGS

FIG. 11 shows a process for receiving partial messages.

FIG. 12 shows an apparatus for receiving information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement an air interface such as cdma2000, Universal Terrestrial Radio Access (UTRA), etc. An OFDMA system may implement an air interface such as Ultra Mobile Broadband (UMB), Evolved UTRA (E-UTRA), IEEE 802.11 (which is also referred to as Wi-Fi), IEEE 802.16 (which is also referred to as WiMAX), IEEE 802.20, Flash-OFDM®, etc. These various air interfaces and standards are known in the art.

For clarity, certain aspects of the techniques are described below for WiMAX, which is described in IEEE 802.16, entitled "Part 16: Air Interface for Fixed and Mobile Broadband Wireless Access Systems," Oct. 1, 2004, and in IEEE 802.16e, entitled "Part 16: Air Interface for Fixed and Mobile Broadband Wireless Access Systems; Amendment 2: Physical and Medium Access Control Layers for Combined Fixed and Mobile Operation in Licensed Bands," Feb. 28, 2006. These IEEE 802.16 documents are publicly available. The techniques may also be used for IEEE 802.16m, which is a new air interface being developed for WiMAX.

Figure 1:
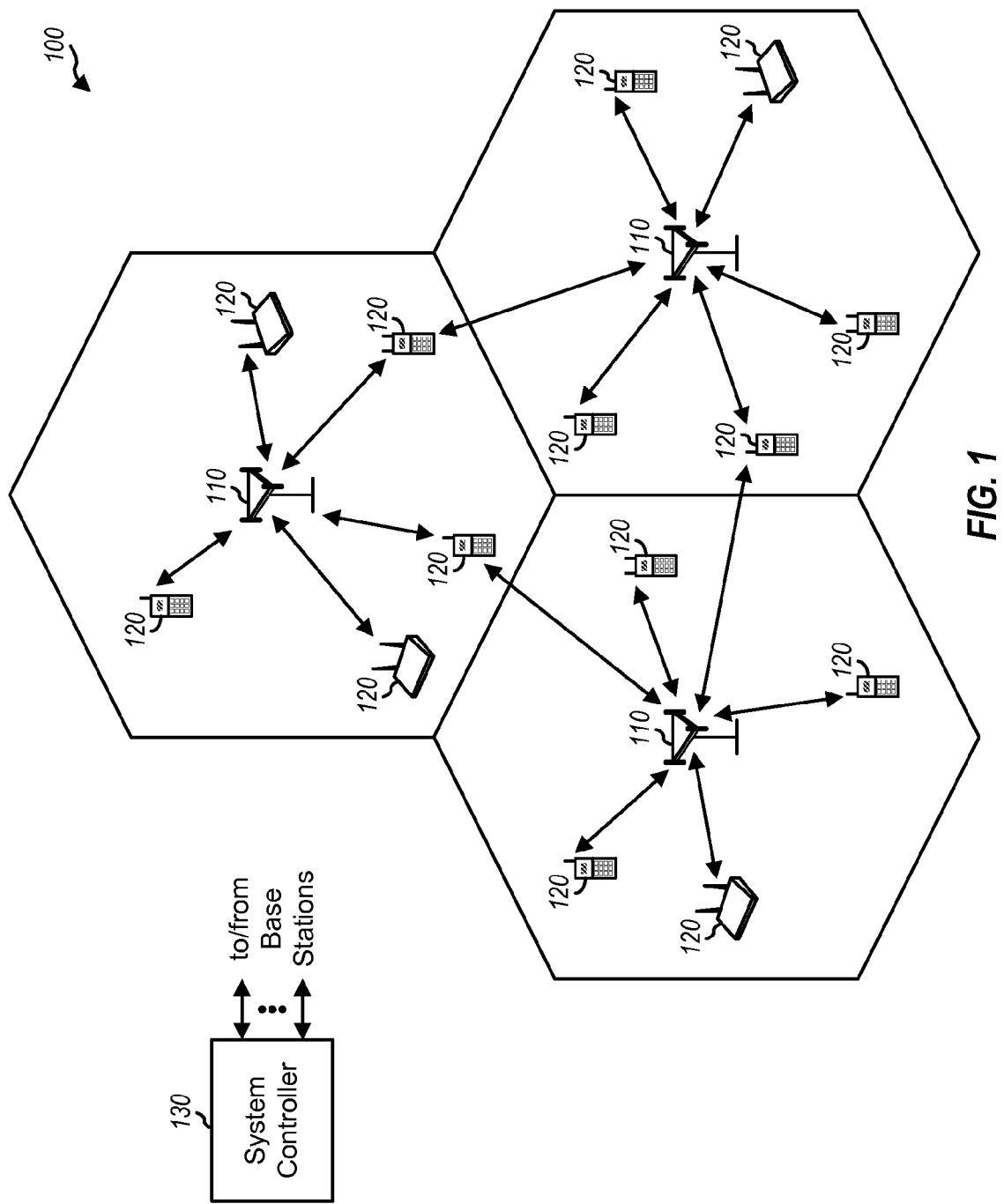
FIG. 1 shows a wireless communication system.

FIG. 1 shows a wireless communication system 100 with multiple base stations (BS) 110 and multiple subscriber stations (SS) 120. A base station is a station that communicates with the subscriber stations. A base station may also be referred to as an access point, a Node B, an evolved Node B, etc. Each base station may provide communication coverage for a particular geographic area and may serve the subscriber stations within its coverage area. A system controller 130 may couple to the base stations and provide coordination and control for these base stations.

Subscriber stations 120 may be dispersed throughout the system, and each subscriber station may be stationary or mobile. A subscriber station may also be referred to as a mobile station, a terminal, an access terminal, a user equipment, a subscriber unit, a station, etc. A subscriber station may be a cellular phone, a personal digital assistant (PDA), a wireless communication device, a wireless modem, a handheld device, a laptop computer, a cordless phone, etc. A subscriber station may communicate with a base station on the downlink (DL) and/or uplink (UL). The downlink (or forward link) refers to the communication link from the base stations to the subscriber stations, and the uplink (or reverse link) refers to the communication link from the subscriber stations to the base stations.

Figure 2:
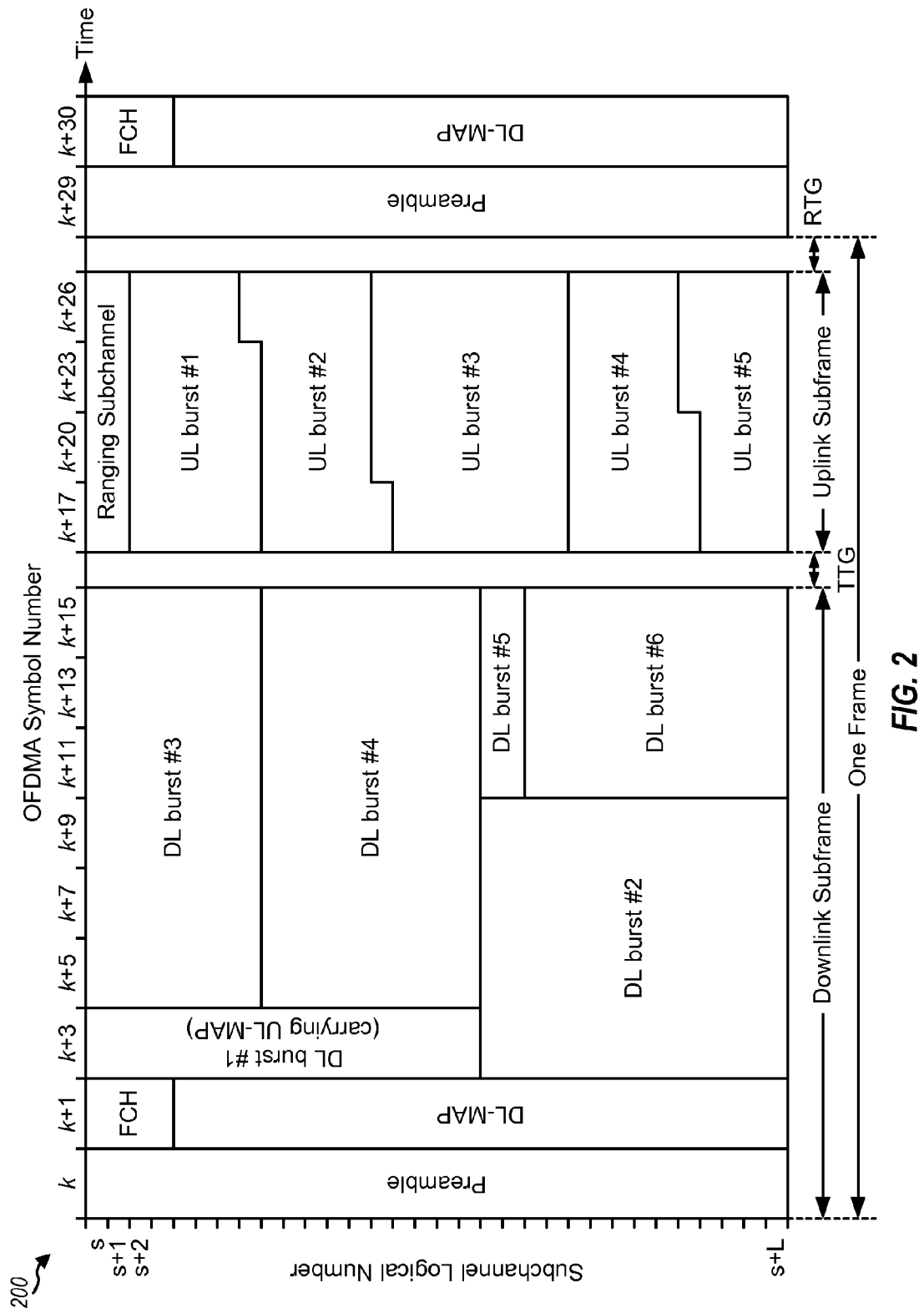
FIG. 2 shows an example frame structure.

FIG. 2 shows an example frame structure 200 for a time division duplex (TDD) mode in IEEE 802.16. The transmission timeline may be partitioned into units of frames. Each frame may span a predetermined time duration, e.g., 5 milliseconds (ms), and may be partitioned into a downlink subframe and an uplink subframe. The downlink and uplink subframes may be separated by a transmit transmission gap (TTG) and a receive transmission gap (RTG).

The downlink subframe may include a preamble, a frame control header (FCH), a downlink map (DL-MAP), an uplink map (UL-MAP), and downlink (DL) bursts. The preamble may carry a known transmission that may be used by the subscriber stations for frame detection and synchronization. The FCH may carry parameters used to receive the DL-MAP, the UL-MAP, and the downlink bursts. The DL-MAP may carry a DL-MAP message, which may include various types of information pertinent for downlink transmissions. The UL-MAP may carry a UL-MAP message, which may include various types of information pertinent for uplink transmissions. The downlink bursts may carry traffic data for the subscriber stations being served. The uplink subframe may include uplink bursts, which may carry traffic data from the subscriber stations scheduled for uplink transmission.

In general, the downlink and uplink subframes may cover any fraction of a frame. In the design shown in FIG. 2, a frame spans 29 OFDM symbols, the downlink subframe covers 15 OFDM symbols, and the uplink subframe covers 14 OFDM symbols. The frame, downlink subframe, and uplink subframe may also have other durations, which may be fixed or configurable.

Figure 3:
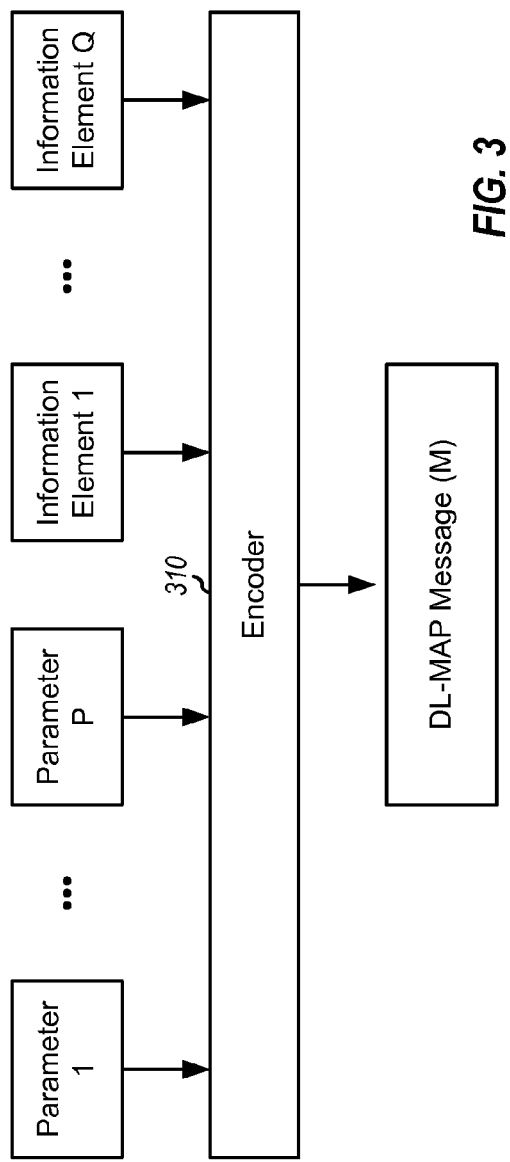
FIG. 3 shows generation of a downlink map (DL-MAP) message.

FIG. 3 shows generation of a DL-MAP message. The DL-MAP message may include various parameters such as a downlink channel descriptor (DCD) count, a base station identifier (ID), an operator ID, a sector ID, etc. These parameters are described in the aforementioned IEEE 802.16 documents. Various information elements (IEs) may also be sent in the DL-MAP message and are also described in the IEEE 802.16 documents. The parameters and IEs may include different types of information to be sent in the DL-MAP message. An encoder 310 may format and encode the various parameters and IEs to generate the DL-MAP message.

Similarly, various parameters and IEs may be sent in a UL-MAP message and are described in the IEEE 802.16 documents. These various parameters and IEs may be formatted and encoded to generate the UL-MAP message.

Figure 4:
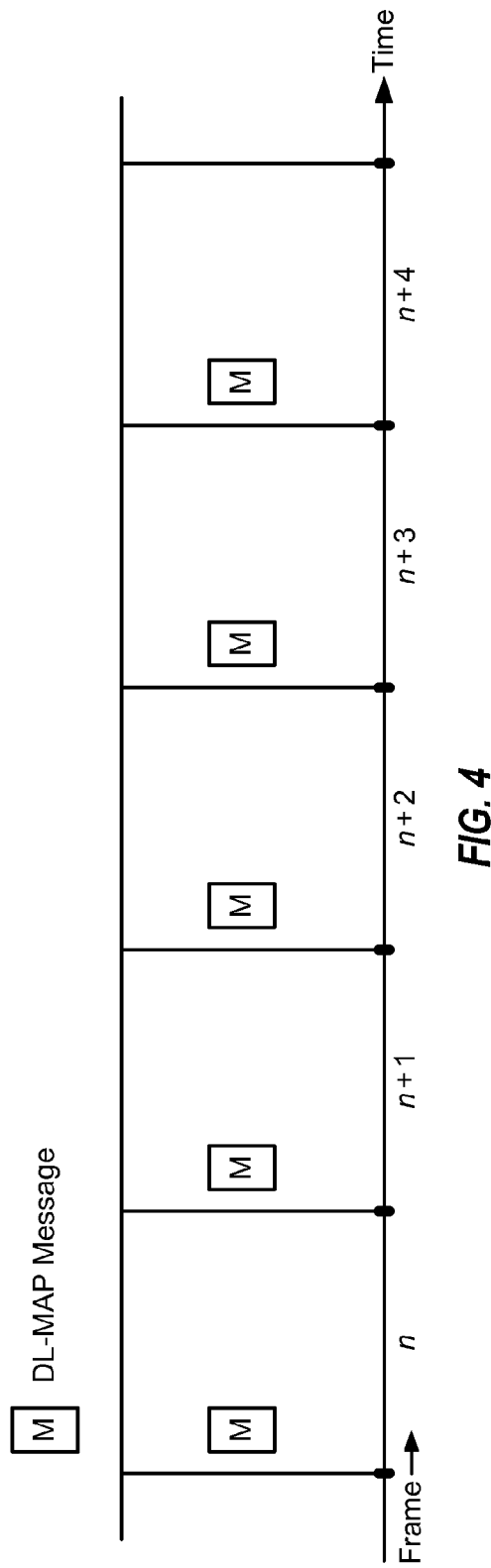
FIG. 4 shows transmission of the DL-MAP message.

FIG. 4 shows transmission of the DL-MAP message in accordance with IEEE 802.16. A new DL-MAP message may be generated in each frame based on current information for the parameters and IEs to be sent in the DL-MAP message. The DL-MAP message generated in each frame may be sent in a portion of the downlink subframe in that frame, as shown in FIGS. 2 and 4.

Similarly, a new UL-MAP message may be generated in each frame based on current information for the parameters and IEs to be sent in the UL-MAP message. The UL-MAP message generated in each frame may be sent in a portion of the downlink subframe in that frame, as shown in FIG. 2 but not FIG. 4.

A subscriber station may process the FCH in a downlink subframe to obtain pertinent information to process the DL-MAP and UL-MAP messages. The subscriber station may then process the downlink subframe in accordance with the information from the FCH to recover the DL-MAP message. The subscriber station may ascertain whether it has been scheduled for downlink transmission based on the DL-MAP message. If scheduled for downlink transmission, the subscriber station may process its downlink burst based on the information obtained from the DL-MAP message.

The subscriber station may also process the downlink subframe in accordance with the information from the FCH to recover the UL-MAP message. The subscriber station may ascertain whether it has been scheduled for uplink transmission based on the UL-MAP message. If scheduled for uplink transmission, the subscriber station may send data in its uplink burst based on the information obtained from the UL-MAP message.

The DL-MAP and UL-MAP messages carry information used by the subscriber stations to receive data on the downlink and to send data on the uplink. The DL-MAP and UL-MAP messages may be relatively long and may be transmitted such that they can be reliably received by all subscriber stations. A relatively large amount of resources may be consumed to send the DL-MAP and UL-MAP messages in each frame.

In an aspect, the information to send in a MAP message may be fragmented or split into multiple parts, with each part including information of a particular type. The multiple parts may be segregated into multiple categories such as dynamic, semi-static, and static. The dynamic category may include one or more parts that may change most frequently, e.g., from frame to frame. The information in the dynamic category may thus be specific to the frame in which the information is sent. The semi-static category may include one or more parts that may change less frequently. The static category may include one or more parts that may change very infrequently or not at all. The information in the semi-static and static categories may describe characteristics of the system, the base station, etc. In general, the information to send in the MAP message may be fragmented into any number of parts, which may be segregated into any number of categories. The parts in each category may be efficiently encoded and transmitted as described below.

In general, the types of information to send in a control message for each link may be dependent on the air interface or system. Table 1 lists some parameters and IEs that may be sent in a DL-MAP message in IEEE 802.16 and provides a short description and a categorization of each type of information.

TABLE 1

IEs and Parameters for DL-MAP message

| IEs & Parameters | Category | Description |
|---|---|---|
| HARQ DL MAP | Dynamic | Define one or more two-dimensional data regions. |
| DL HARQ ACK | Dynamic | Carry ACK for HARQ traffic on the uplink. |

TABLE 1-continued

IEs and Parameters for DL-MAP message

| IEs & Parameters | Category | Description |
| --- | --- | --- |
| STC DL zone switch | Dynamic | Carry information for space-time coding (STC). |
| HARQ and sub-MAP pointer | Dynamic | Carry pointers to sub-DL/UL MAP messages. |
| UL noise and interference level | Semi-static | Convey UL interference and noise level (dBm) estimated at the base station. |
| DCD count | Semi-static | Describe physical layer (PHY) characteristics of a downlink channel. |
| Base station ID | Static | Base station identifier. |
| Operator ID | Static | Formed by 8 designated middle bits of the base station ID. |
| Sector ID | Static | Formed by 8 least significant bits (LSBs) of the base station ID. |

Figure 5:
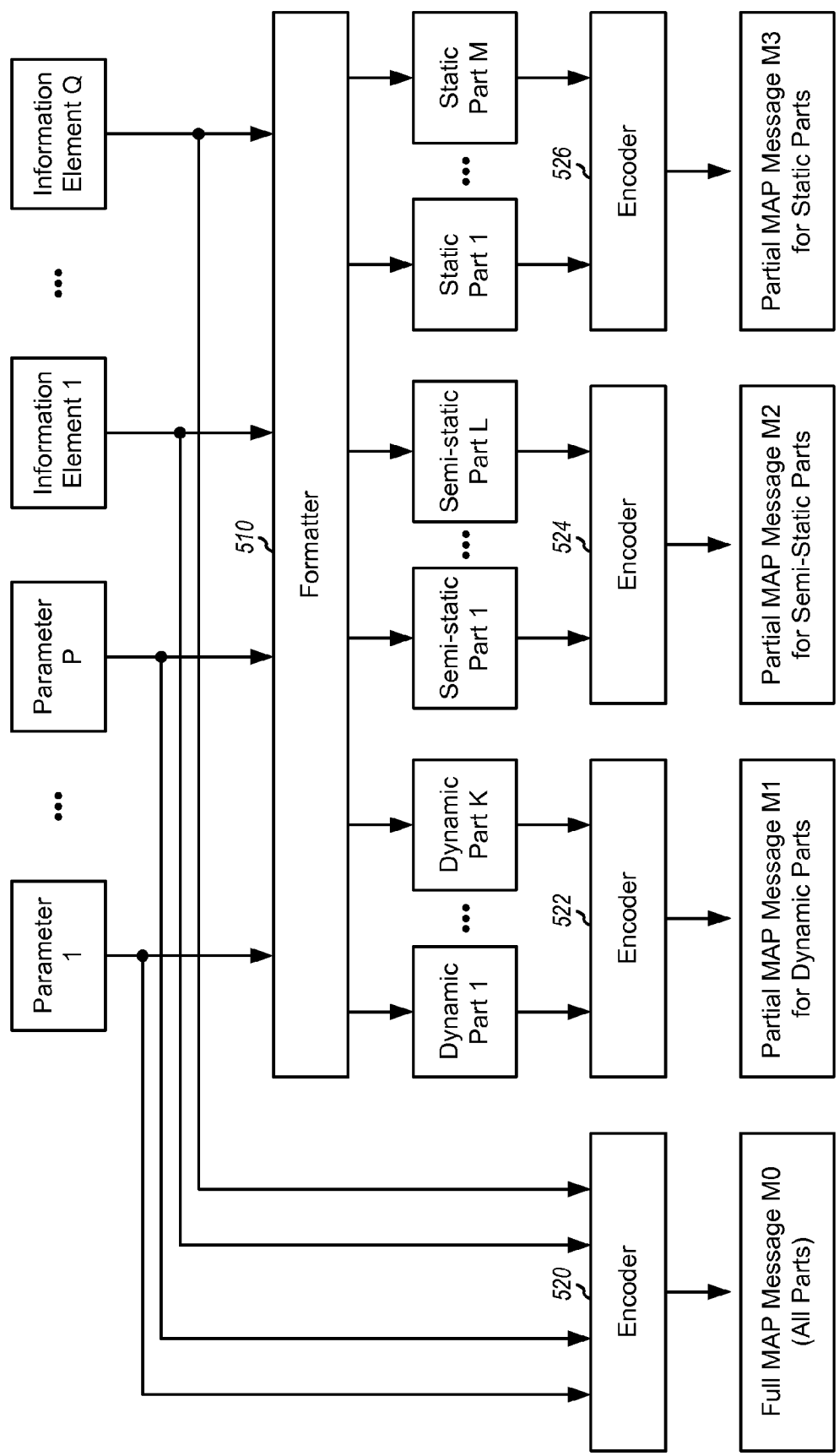
FIG. 5 shows generation of full and partial MAP messages.

FIG. 5 shows a design of generating full and partial MAP messages for a DL-MAP message or a UL-MAP message. A formatter 510 may receive and fragment the various parameters 1 through P and various IEs 1 through Q into multiple parts and may segregate these parts into dynamic, semi-static, and static categories based on the characteristic of the information in each part. In general, each category may include any number of parts. In the example shown in FIG. 5, the dynamic category includes K dynamic parts 1 through K, the semi-static category includes L semi-static parts 1 through L, and the static category includes M static parts 1 through M, where in general $K \geq 1$, $L \geq 0$ and $M \geq 0$.

An encoder 520 may format and encode all of the parameters and IEs in the normal manner and generate a full MAP message, which is labeled as M0 in FIG. 5. An encoder 522 may format and encode dynamic parts 1 through K and generate a first partial MAP message for the dynamic category, which is labeled as M1. An encoder 524 may format and encode semi-static parts 1 through L and generate a second partial MAP message for the semi-static category, which is labeled as M2. An encoder 526 may format and encode static parts 1 through M and generate a third partial MAP message for the static category, which is labeled as M3.

In the design shown in FIG. 5, encoder 520 may generate one full MAP message containing all parts, and encoders 522, 524 and 526 may generate three partial MAP messages for the three categories. The partial MAP message for each category may contain all parts in that category. Each partial MAP message may be encoded separately by the base station and may be decoded separately by a subscriber station.

In another design, the parts in a given category may be further partitioned into multiple sub-categories, which may be for different types of information. For example, a sub-category may include parts containing information related to multiple-input multiple-output (MIMO) operation. This sub-category may be of interest to subscriber stations supporting MIMO and may be ignored by subscriber stations not supporting MIMO. One partial MAP message may be generated for each sub-category. Partitioning the parts into multiple sub-categories may allow for generation of smaller partial MAP messages. For clarity, the following description assumes that one partial MAP message is generated for each category.

FIG. 5 shows generation of a full MAP message as well as a partial MAP message for each category. In one design, either a full MAP message or a partial MAP message may be generated in each frame based on the information to send in that frame.

In another aspect, the partial MAP messages for different categories may be sent at different rates in order to reduce overhead. The parts in the dynamic category may be sent at the highest rate (e.g., in each frame) to provide current information. The parts in the semi-static category may be sent at a less frequent rate, e.g., once every S frames, where S may be any suitable value. The parts in the static category may be sent at a less frequent rate, e.g., once every T frames, where T may be any suitable value and may be larger than S.

In one design, the full MAP message may be sent at an infrequent rate, e.g., once every R frames, where R may be any suitable value. Some legacy subscriber stations may not be able to decode the partial MAP messages. The full MAP message may be sent periodically in order to support the legacy subscriber stations. These subscriber stations may be able to decode the full MAP message in each frame in which the message is sent. These subscriber stations may obtain decoding errors for the full MAP message in each frame in which the message is not sent and may simply wait until the next frame. Transmission of the full MAP message at a slower rate may maintain backward compatibility for the legacy subscriber stations while reducing overhead.

Figure 6:
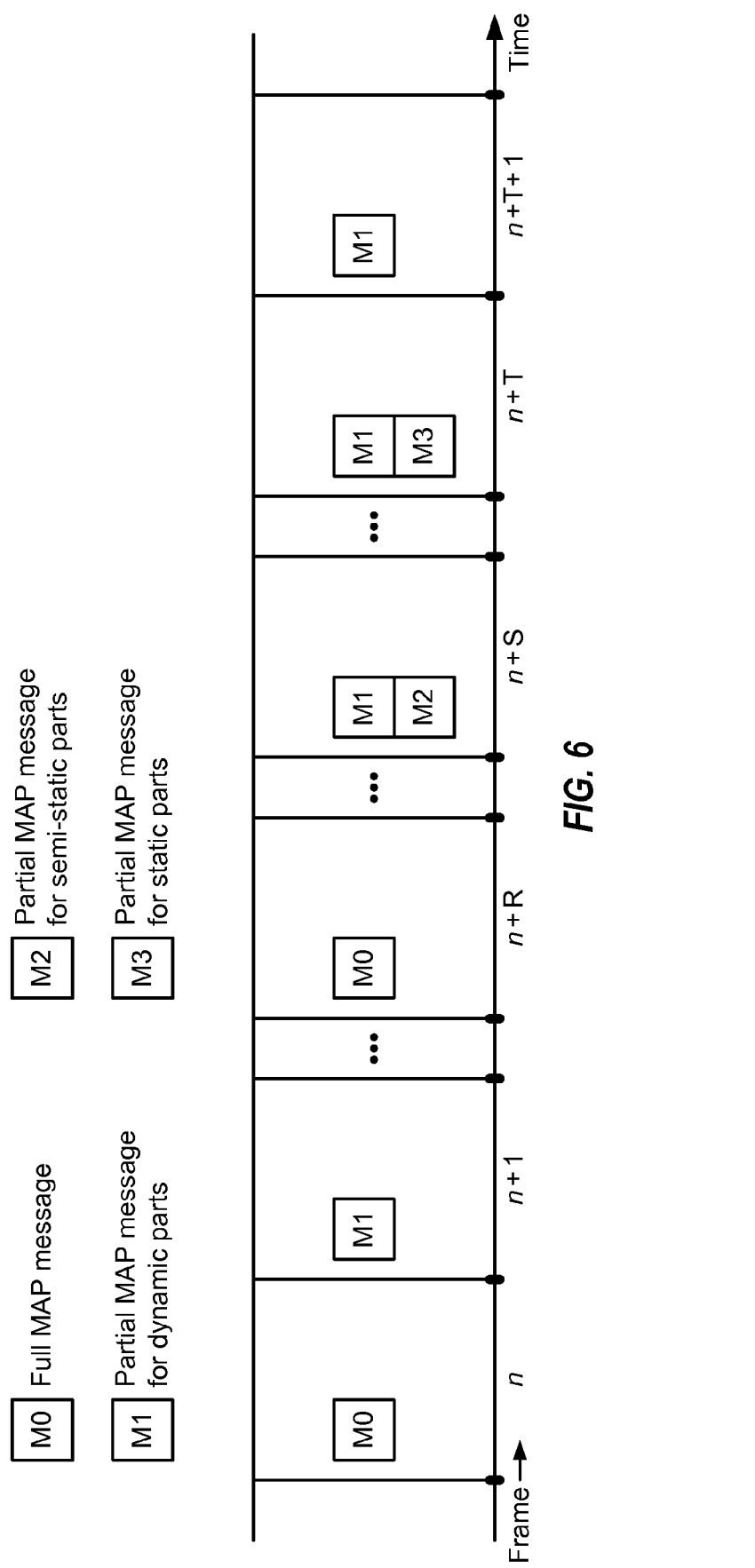
FIG. 6 shows transmission of the full and partial MAP messages.

FIG. 6 shows a design of transmitting the full and partial MAP messages. In this design, the full MAP message M0 may be sent periodically every R frames, e.g., in frames n, n+R, etc. Since the full MAP message contains all parts for all categories, the partial MAP messages do not need to be sent in each frame in which the full MAP message is sent.

The first partial MAP message M1 for the dynamic category may be sent at the highest rate, e.g., in each frame in which the full MAP message is not sent. This allows current information to be sent in either the full MAP message or the first partial MAP message in each frame.

The second partial MAP message M2 for the semi-static category may be sent at a slower rate than the first partial MAP message. For example, the parts in the second partial MAP message M2 may be sent periodically approximately every S frames, e.g., in frames n, n+S, etc. These parts may be sent in the full MAP message whenever this message is sent, e.g., in frame n. These parts may also be sent in the second partial MAP message M2 for the semi-static category, e.g., in frame n+S.

The third partial MAP message M3 for the static category may be sent at a slower rate than the second partial MAP message M2. For example, the parts in the third partial MAP message M3 may be sent periodically approximately every T frames, e.g., in frames n, n+T, etc. These parts may be sent in the full MAP message whenever this message is sent, e.g., in frame n. These parts may also be sent in the third partial MAP message M3 for the static category, e.g., in frame n+S.

In one design, the full and partial MAP messages may be sent as follows:

Rate 1 (highest rate)—dynamic parts,
Rate 2 (slower than rate 1)—full MAP message,
Rate 3 (slower than rate 2)—semi-static parts, and
Rate 4 (slower than rate 3)—static parts.

In another design, the full MAP message may be sent at a slower rate than the semi-static parts.

In general, the rates for the full and partial MAP messages may be selected based on various factors such as overhead for sending the information, delay in receiving the information, etc. A subscriber station may require one or more parts in each category in order to receive data on the downlink and/or to transmit data on the uplink. Sending the information less frequently may reduce overhead but may extend the amount of time needed to receive the parts required for downlink and/or uplink transmission. The rates for the full and partial MAP messages may be selected based on a tradeoff between overhead and delay. In one design, the partial MAP messages for the semi-static and static categories may be sent less frequently than the full MAP message, as shown in FIG. 6. In another design, the partial MAP messages for the semi-static and static categories may be sent more frequently than the full MAP message. In this case, new subscriber stations may be able to receive and consolidate the parts from these partial MAP messages without having to wait for the full MAP message. The legacy subscriber stations may ignore the partial MAP messages or may decode them in error and ignore the decoding errors.

In one design, the base station may broadcast indication or information indicative of how the partial MAP messages are sent. This information may indicate that the DL/UL-MAP is transmitted in partial MAP messages and how to receive and assemble the partial MAP messages to obtain the DL/UL-MAP. The partial MAP messages may also be transmitted using certain frequency bandwidth that may be conveyed to or known by the new subscriber stations, using beacon broadcast over a portion of the system bandwidth at high power, or using some other techniques. In one design, a subscriber station may send a negative acknowledgement (NACK) for a partial MAP message decoded in error. In this design, the base station may resend each partial MAP message for which NACK is received. In another design, the base station may perform auto retransmission for partial MAP messages decoded in errors by the new subscriber stations.

Figure 7:
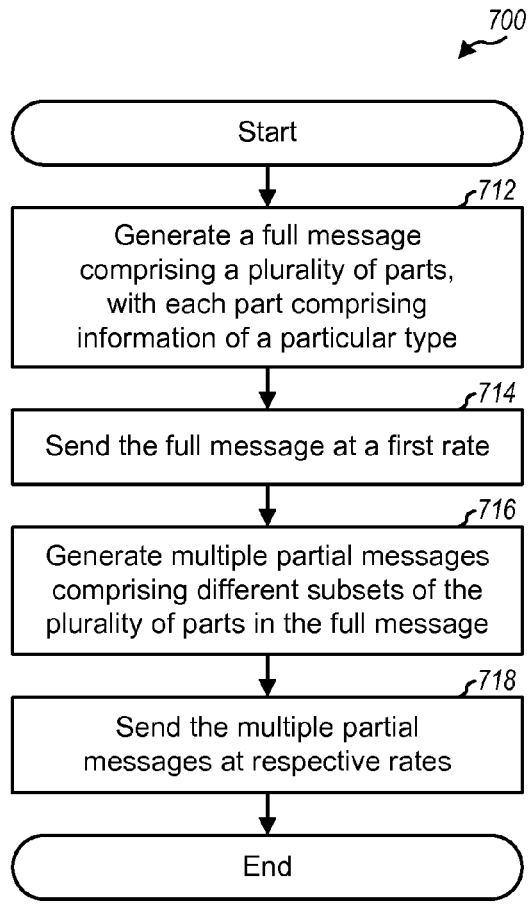
FIG. 7 shows a process for sending full and partial messages.

FIG. 7 shows a design of a process 700 performed by a base station to send information in full and partial messages. The base station may generate a full message comprising a plurality of parts, with each part comprising information of a particular type (block 712). The full message may comprise a DL-MAP message, a UL-MAP message, or some other control message. The base station may send the full message at a first rate (block 714). The base station may generate multiple partial messages comprising different subsets of the plurality of parts in the full message (block 716). In one design, the different subsets do not overlap, and the multiple partial messages comprise different parts in the full message. In another design, the different subsets overlap partially, and a given part may be sent in more than one partial message. The base station may send the multiple partial messages at respective rates, e.g., at different rates (block 718).

Figure 8:
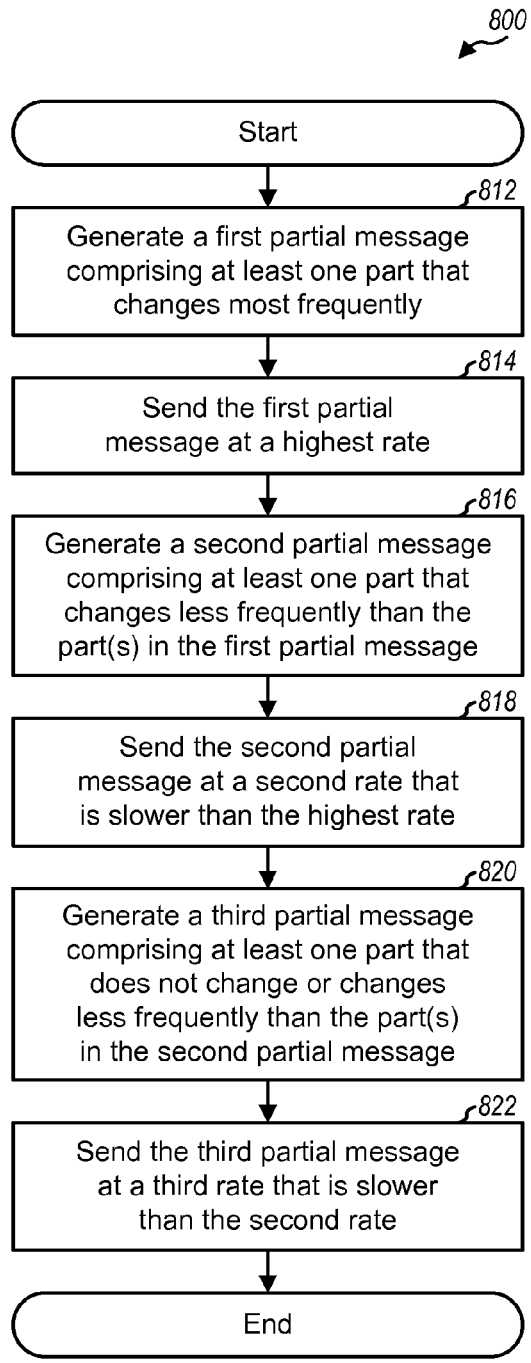
FIG. 8 shows a process for sending partial messages.

FIG. 8 shows a design of a process 800 performed by the base station to send partial messages. Process 800 may be used for blocks 716 and 718 in FIG. 7. The base station may generate a first partial message comprising at least one part that belongs in a dynamic category and changes most frequently, e.g., in each frame (block 812). The base station may send the first partial message at a highest rate, e.g., in each frame in which the full message is not sent (block 814). The base station may generate a second partial message comprising at least one part that belongs in a semi-static category and changes less frequently than the at least one part in the first partial message (block 816). The base station may send the second partial message at a second rate that is slower than the highest rate (block 818). The base station may generate a third partial message comprising at least one part that belongs in a static category and does not change or changes less frequently than the at least one part in the second partial message (block 820). The base station may send the third partial message at a third rate that is slower than the second rate (block 822).

In the design shown in FIG. 8, three partial messages are generated for three categories and sent at three different rates. The base station may also generate fewer or more partial messages for fewer or more categories. In another design, the base station may generate only two partial messages for dynamic and semi-static categories, or for dynamic and static categories. The base station may also generate more than one partial message for more than one sub-category of a given category.

The types of information to include in each partial message may be dependent on the system. In one design, the first partial message may include resource allocation information, acknowledgement information, and/or pointer information. The second partial message may include interference and noise information and/or physical layer (PHY) information. The third partial message may include base station ID information. Each partial message may also include other types of information.

Figure 9:
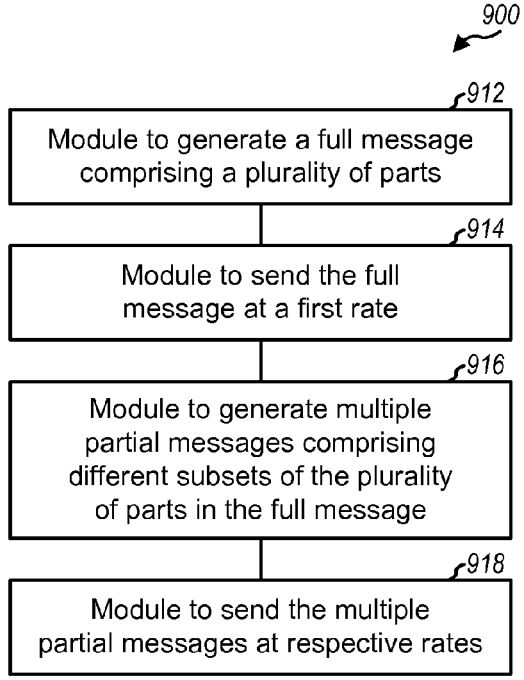
FIG. 9 shows a design of an apparatus for sending information.

FIG. 9 shows a design of an apparatus 900 for sending information. Apparatus 900 includes means for generating a full message comprising a plurality of parts, with each part comprising information of a particular type (module 912), means for sending the full message at a first rate (module 914), means for generating multiple partial messages comprising different subsets of the plurality of parts in the full message (module 916), and means for sending the multiple partial messages at respective rates (module 918).

Figure 10:
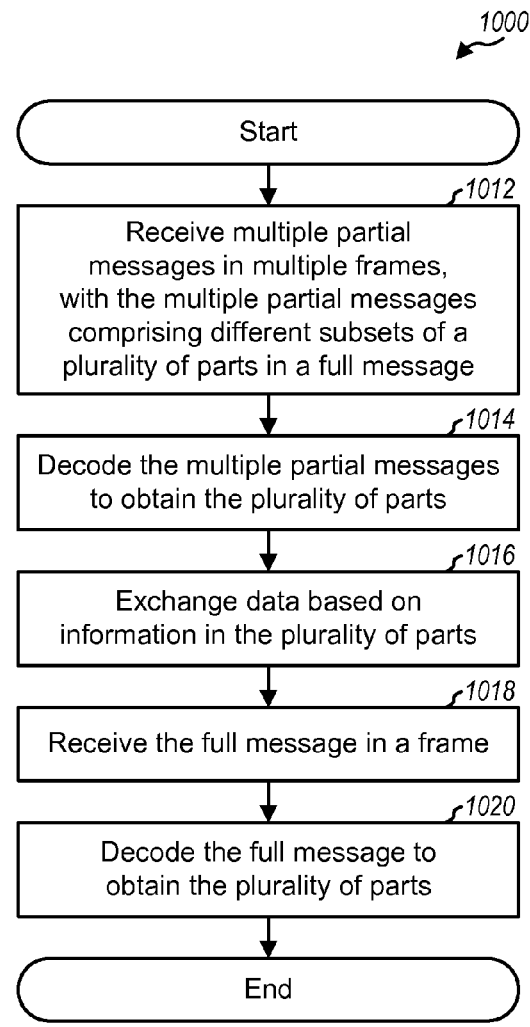
FIG. 10 shows a process for receiving full and partial messages.

FIG. 10 shows a design of a process 1000 performed by a subscriber station to receive information from full and partial messages. The subscriber station may receive multiple partial messages in multiple frames, with the multiple partial messages comprising different subsets of a plurality of parts in a full message, and with each part comprising information of a particular type (block 1012). The subscriber station may decode the multiple partial messages to obtain the plurality of parts (block 1014). The subscriber station may exchange data (e.g., receive data on the downlink and/or send data on the uplink) based on information in the plurality of parts (block 1016). The subscriber station may also receive the full message in a frame (block 1018) and may decode the full message to obtain the plurality of parts (block 1020).

FIG. 11 shows a design of a process 1100 performed by the subscriber station to receive partial messages. Process 1100 may be used for blocks 1012 and 1014 in FIG. 10. The subscriber station may receive a first partial message in a first frame (block 1112) and may decode the first partial message to obtain at least one part that changes most frequently (block 1114). The subscriber station may receive a second partial message in a second frame (block 1116) and may decode the second partial message to obtain at least one part that changes less frequently than the at least one part in the first partial message (block 1118). The subscriber station may receive a third partial message in a third frame (block 1120) and may decode the third partial message to obtain at least one part that does not change or changes less frequently than the at least one part in the second partial message (block 1122).

FIG. 12 shows a design of an apparatus 1200 for receiving information. Apparatus 1200 includes means for receiving multiple partial messages in multiple frames, with the multiple partial messages comprising different subsets of a plurality of parts in a full message, and with each part comprising information of a particular type (module 1212), means for decoding the multiple partial messages to obtain the plurality of parts (module 1214), means for exchanging data based on information in the plurality of parts (module 1216), means for receiving the full message in a frame (module 1218), and means for decoding the full message to obtain the plurality of parts (module 1220).

The modules in FIGS. 9 and 12 may comprise processors, electronics devices, hardware devices, electronics components, logical circuits, memories, etc., or any combination thereof.

Figure 13:
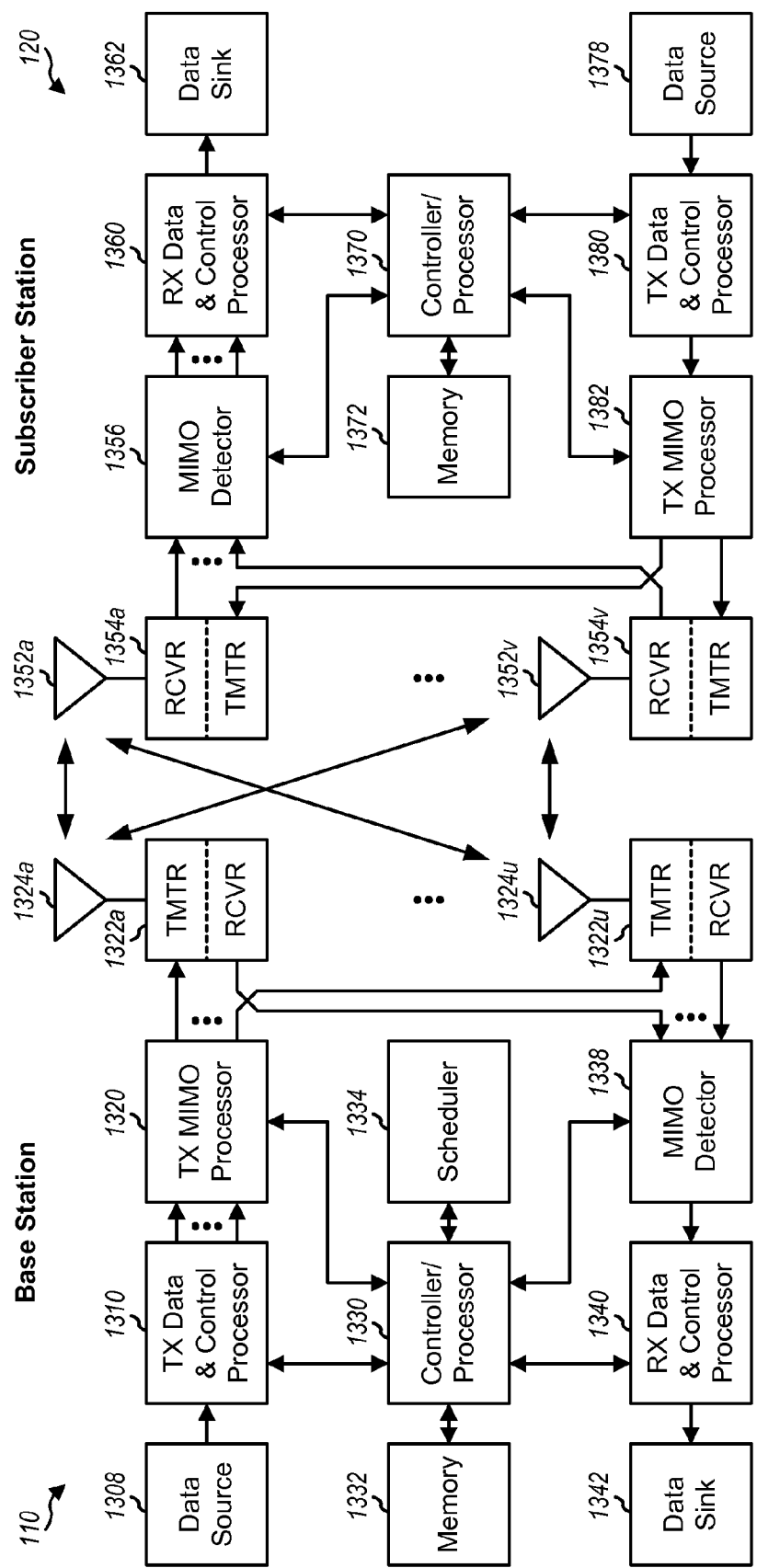
FIG. 13 shows a block diagram of a base station and a subscriber station.

FIG. 13 shows a block diagram of a design of a base station 110 and a subscriber station 120, which are one of the base stations and one of the subscriber stations in FIG. 1. In this design, base station 110 is equipped with U antennas 1324a through 1324u, and subscriber station 120 is equipped with V antennas 1352a through 1352v, where in general $U \geq 1$ and $V \geq 1$.

On the downlink, at base station 110, a transmit (TX) data and control processor 1310 may receive data from a data source 1308, process (e.g., encode, interleave, and symbol map) the data, and provide data symbols. Processor 1310 may also receive information for one or more control messages (e.g., a DL-MAP message and/or a UL-MAP message), fragment the information into parts, and process these parts to generate control symbols for full and partial messages. A TX MIMO processor 1320 may multiplex the data and control symbols with pilot symbols, perform MIMO processing if applicable, and provide U output symbol streams to U transmitters (TMTR) 1322a through 1322u. Each transmitter 1322 may process its output symbol stream (e.g., for OFDM) to obtain an output chip stream. Each transmitter 1322 may further condition (e.g., convert to analog, filter, amplify, and upconvert) its output chip stream and generate a downlink signal. U downlink signals from transmitters 1322a through 1322u may be transmitted from U antennas 1324a through 1324u, respectively.

At subscriber station 120, V antennas 1352a through 1352v may receive the downlink signals from base station 110, and each antenna 1352 may provide a received signal to a respective receiver (RCVR) 1354. Each receiver 1354 may condition (e.g., filter, amplify, downconvert, and digitize) its received signal to obtain samples, process the samples (e.g., for OFDM) to obtain received symbols, and provide the received symbols to a MIMO detector 1356. MIMO detector 1356 may perform MIMO detection on the received symbols, if applicable, and provide detected symbols. A receive (RX) data and control processor 1360 may process (e.g., symbol demap, deinterleave, and decode) the detected symbols to obtain decoded data and decoded full and partial messages. Processor 1360 may provide the decoded data to a data sink 1362 and provide the decoded messages to a controller/processor 1370. In general, the processing by MIMO detector 1356 and RX data and control processor 1360 is complementary to the processing by TX MIMO processor 1320 and TX data and control processor 1310 at base station 110.

On the uplink, at subscriber station 120, a TX data and control processor 1380 may receive data from data source 1378 and information from controller/processor 1370, process the data and information, and provide symbols. The symbols from processor 1380 may be multiplexed with pilot symbols and spatially processed by a TX MIMO processor 1382, and further processed by transmitters 1354a through 1354v to obtain V uplink signals, which may be transmitted via antennas 1352a through 1352v. At base station 110, the uplink signals from subscriber station 120 may be received by antennas 1324a through 1324u, processed by receivers 1322a through 1322u, detected by a MIMO detector 1338, and further processed by an RX data and control processor 1340 to recover the data and information transmitted by subscriber station 120.

Controllers/processors 1330 and 1370 may direct the operation at base station 110 and subscriber station 120, respectively. Memories 1332 and 1372 may store data and program codes for base station 110 and subscriber station 120, respectively. A scheduler 1334 may schedule subscriber station 120 for data transmission on the downlink and/or uplink and may assign resources for the data transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   at least one processor configured to generate a full message comprising a plurality of parts, each part comprising information of a particular type, to send the full message at a first rate, to generate multiple partial messages comprising different subsets of the plurality of parts in the full message, and to send the multiple partial messages at respective rates; and
   a memory coupled to the at least one processor.

2. The apparatus of claim 1, wherein the at least one processor is configured to send the multiple partial messages at different rates.

3. The apparatus of claim 1, wherein the at least one processor is configured to generate a first partial message comprising at least one part that changes most frequently, and to send the first partial message at a highest rate faster than the first rate.

4. The apparatus of claim 3, wherein the at least one processor is configured to generate a second partial message comprising at least one part that changes less frequently than the at least one part in the first partial message, and to send the second partial message at a second rate slower than the highest rate.

5. The apparatus of claim 4, wherein the at least one processor is configured to generate a third partial message comprising at least one part that does not change or changes less frequently than the at least one part in the second partial message, and to send the third partial message at a third rate slower than the second rate.

6. The apparatus of claim 3, wherein the first partial message comprises at least one of resource allocation information, acknowledgement information, and pointer information.

7. The apparatus of claim 4, wherein the second partial message comprises at least one of interference and noise information and physical layer (PHY) information.

8. The apparatus of claim 5, wherein the third partial message comprises base station identifier information.

9. The apparatus of claim 1, wherein the full message comprises a downlink map (DL-MAP) message.

10. A method for wireless communication, comprising:
    generating a full message comprising a plurality of parts, each part comprising information of a particular type;
    sending the full message at a first rate;
    generating multiple partial messages comprising different subsets of the plurality of parts in the full message; and
    sending the multiple partial messages at respective rates.

11. The method of claim 10, wherein the generating the multiple partial messages comprises generating a first partial message comprising at least one part that changes most frequently, and wherein the sending the multiple partial messages comprises sending the first partial message at a highest rate faster than the first rate.

12. The method of claim 11, wherein the generating the multiple partial messages further comprises generating a second partial message comprising at least one part that changes less frequently than the at least one part in the first partial message, and wherein the sending the multiple partial messages further comprises sending the second partial message at a second rate slower than the highest rate.

13. The method of claim 12, wherein the generating the multiple partial messages further comprises generating a third partial message comprising at least one part that does not change or changes less frequently than the at least one part in the second partial message, and wherein the sending the multiple partial messages further comprises sending the third partial message at a third rate slower than the second rate.

14. An apparatus for wireless communication, comprising:
    means for generating a full message comprising a plurality of parts, each part comprising information of a particular type;
    means for sending the full message at a first rate;
    means for generating multiple partial messages comprising different subsets of the plurality of parts in the full message; and
    means for sending the multiple partial messages at respective rates.

15. The apparatus of claim 14, wherein the means for generating the multiple partial messages comprises means for generating a first partial message comprising at least one part that changes most frequently, and wherein the means for sending the multiple partial messages comprises means for sending the first partial message at a highest rate faster than the first rate.

16. The apparatus of claim 15, wherein the means for generating the multiple partial messages further comprises means for generating a second partial message comprising at least one part that changes less frequently than the at least one part in the first partial message, and wherein the means for sending the multiple partial messages further comprises means for sending the second partial message at a second rate slower than the highest rate.

17. The apparatus of claim 16, wherein the means for generating the multiple partial messages further comprises means for generating a third partial message comprising at least one part that does not change or changes less frequently than the at least one part in the second partial message, and wherein the means for sending the multiple partial messages further comprises means for sending the third partial message at a third rate slower than the second rate.

18. An apparatus for wireless communication, comprising:
at least one processor configured to receive multiple partial messages in multiple frames, the multiple partial messages comprising different subsets of a plurality of parts in a full message, each part comprising information of a particular type, to decode the multiple partial messages to obtain the plurality of parts, and to exchange data based on information in the plurality of parts; and
a memory coupled to the at least one processor.

19. The apparatus of claim 18, wherein the at least one processor is configured to receive the full message in a frame and to decode the full message to obtain the plurality of parts.

20. The apparatus of claim 18, wherein the at least one processor is configured to receive a first partial message in a first frame and to decode the first partial message to obtain at least one part that changes most frequently.

21. The apparatus of claim 20, wherein the at least one processor is configured to receive a second partial message in a second frame and to decode the second partial message to obtain at least one part that changes less frequently than the at least one part in the first partial message.

22. The apparatus of claim 21, wherein the at least one processor is configured to receive a third partial message in a third frame and to decode the third partial message to obtain at least one part that does not change or changes less frequently than the at least one part in the second partial message.

23. A method for wireless communication, comprising:
receiving multiple partial messages in multiple frames, the multiple partial messages comprising different subsets of a plurality of parts in a full message, each part comprising information of a particular type;
decoding the multiple partial messages to obtain the plurality of parts; and
exchanging data based on information in the plurality of parts.

24. The method of claim 23, further comprising:
receiving the full message in a frame; and
decoding the full message to obtain the plurality of parts.

25. The method of claim 23, wherein the receiving the multiple partial messages comprises receiving a first partial message in a first frame, and wherein the decoding the multiple partial messages comprises decoding the first partial message to obtain at least one part that changes most frequently.

26. The method of claim 25, wherein the receiving the multiple partial messages further comprises receiving a second partial message in a second frame, and wherein the decoding the multiple partial messages further comprises decoding the second partial message to obtain at least one part that changes less frequently than the at least one part in the first partial message.

27. The method of claim 26, wherein the receiving the multiple partial messages further comprises receiving a third partial message in a third frame, and wherein the decoding the multiple partial messages further comprises decoding the third partial message to obtain at least one part that does not change or changes less frequently than the at least one part in the second partial message.

28. An apparatus for wireless communication, comprising:
means for receiving multiple partial messages in multiple frames, the multiple partial messages comprising different subsets of a plurality of parts in a full message, each part comprising information of a particular type;
means for decoding the multiple partial messages to obtain the plurality of parts; and
means for exchanging data based on information in the plurality of parts.

29. The apparatus of claim 28, further comprising:
means for receiving the full message in a frame; and
means for decoding the full message to obtain the plurality of parts.

30. The apparatus of claim 28, wherein the means for receiving the multiple partial messages comprises means for receiving a first partial message in a first frame, and wherein the means for decoding the multiple partial messages comprises means for decoding the first partial message to obtain at least one part that changes most frequently.

31. The apparatus of claim 30, wherein the means for receiving the multiple partial messages further comprises means for receiving a second partial message in a second frame, and wherein the means for decoding the multiple partial messages further comprises means for decoding the second partial message to obtain at least one part that changes less frequently than the at least one part in the first partial message.

32. The apparatus of claim 31, wherein the means for receiving the multiple partial messages further comprises means for receiving a third partial message in a third frame, and wherein the means for decoding the multiple partial messages further comprises means for decoding the third partial message to obtain at least one part that does not change or changes less frequently than the at least one part in the second partial message.

33. A computer program product, comprising:
a computer-readable medium comprising:
code for causing at least one computer to receive multiple partial messages in multiple frames, the multiple partial messages comprising different subsets of a plurality of parts in a full message, each part comprising information of a particular type;
code for causing the at least one computer to decode the multiple partial messages to obtain the plurality of parts; and
code for causing the at least one computer to exchange data based on information in the plurality of parts.

34. The computer program product of claim 33, the computer-readable medium further comprising:
code for causing the at least one computer to receive the full message in a frame; and
code for causing the at least one computer to decode the full message to obtain the plurality of parts.

* * * * *